March 6, 1945.  C. W. HOPPE  2,370,729
COLLECT CHUCK
Filed Sept. 15, 1943  2 Sheets-Sheet 1

INVENTOR
Charles W. Hoppe
BY
Popp and Popp
ATTORNEYS

March 6, 1945. C. W. HOPPE 2,370,729
COLLECT CHUCK
Filed Sept. 15, 1943 2 Sheets-Sheet 2
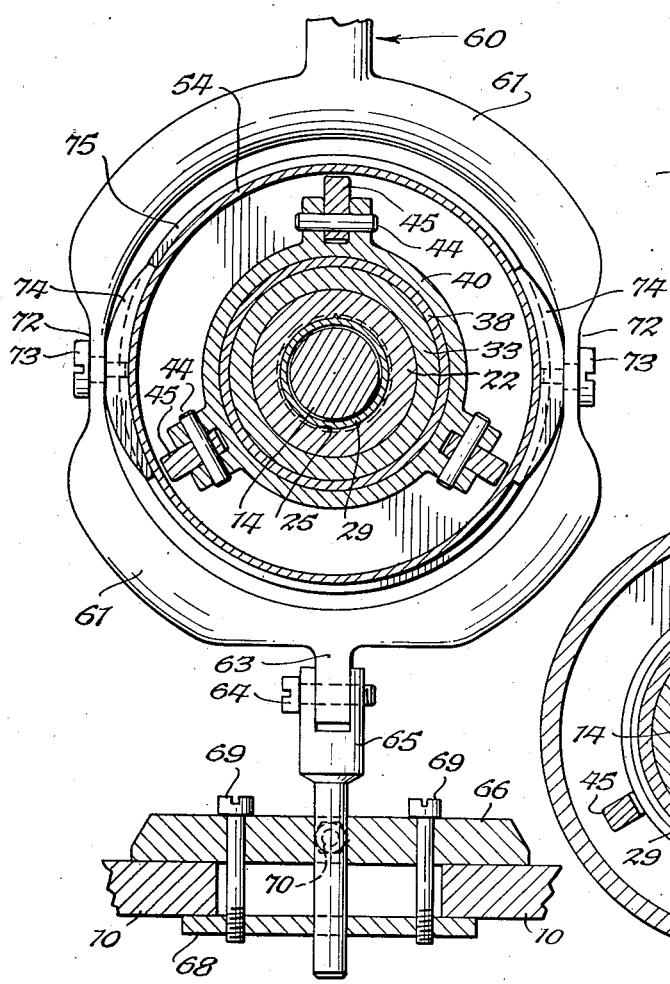
Fig. 3.
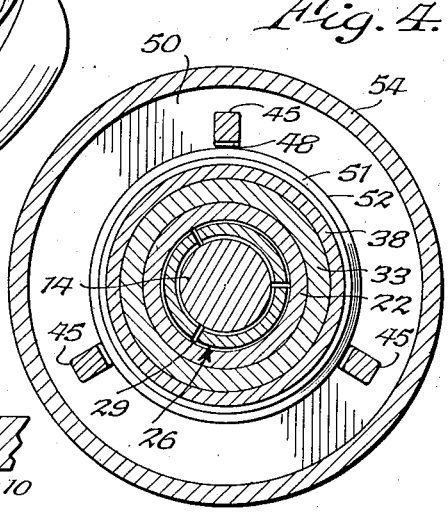
Fig. 4.
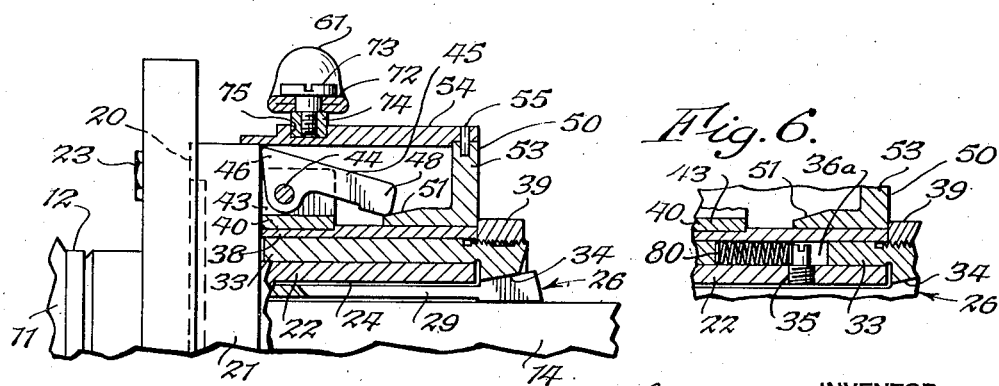
Fig. 5.
Fig. 6.
INVENTOR
Charles W. Hoppe
BY
Poppe and Poppe
ATTORNEYS Patented Mar. 6, 1945

2,370,729

UNITED STATES PATENT OFFICE 2,370,729

COLLET CHUCK

Charles W. Hoppe, Buffalo, N. Y.

Application September 15, 1943, Serial No. 502,429

9 Claims. (Cl. 279—50)

This invention relates to a collet chuck and is more particularly illustrated as used on a lathe although it can also be employed on milling machines, drill presses and the like.

One of the principal objects of the present invention is to provide such a collet chuck which is used in conjunction with standard one-piece collets thereby avoiding the necessity of making collets of special shape for the chuck.

Another object of the invention is to provide such a collet chuck in which the full inside diameter of the main spindle may be utilized, thereby to permit of handling long pieces of stock of the full diameter of the main spindle, the chuck also being capable of supporting short pieces of stock of still larger diameter when inserted directly into the collet.

Another object of the invention is to provide such a collet chuck which will take collets and adapters of various sizes.

A further object of the invention is to provide such a collet chuck which can readily be attached to and removed from the face plate and bed of any lathe.

Another object is to provide such a collet chuck in which the workpiece can be inserted or removed from the chuck while the lathe or other tool is running.

Another aim of the invention is to provide such a collet chuck in which the workpiece can readily be inserted or removed, a short hand lever being provided for operating the chuck and requiring little pressure to apply.

A further object is to provide such a collet chuck which is simple and inexpensive in construction and which will stand up under conditions of severe and constant use without getting out of order or requiring repairs.

In the accompanying drawings:

Figs. 3 and 4 are vertical sectional views, taken on the correspondingly numbered lines of Fig. 2.

Fig. 5 is a fragmentary view similar to Fig. 2 and showing the position of the parts when the workpiece is released.

Fig. 6 is a fragmentary view similar to Fig. 2 and showing a modified form of the invention.

Figure 1:
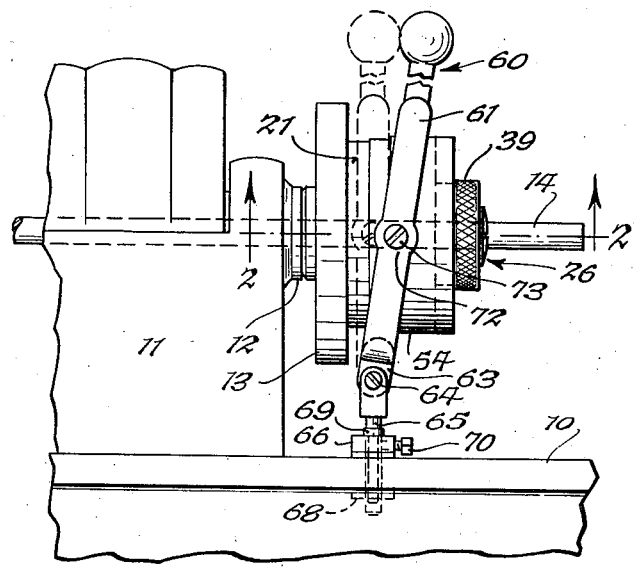
Fig. 1 is a fragmentary front elevational view of a lathe equipped with a collet chuck made in accordance with the present invention.

While the collet chuck can be used on milling machines, drill presses and the like, it is shown as mounted on a lathe of standard construction having the usual bed 10 and end head 11 carrying a rotating spindle 12 to which the usual face plate 13 is secured. The workpiece 14 is shown as being a rod of the full inside diameter 15 of the main spindle 12, although the chuck receives standard one-piece collets and adapters to receive different sizes of workpieces.

To permit of attachment of the collet chuck, the face plate 13 is provided with a groove 18 into which is set a bead 20 provided at the rim of an annular plate 21, this plate also being formed to provide a cylindrical extension or sleeve 22. In the form of the invention shown in Figs. 1–5, the annular plate 21 is shown as secured to the face plate 13 of the lathe by means of screws 23 and the cylindrical extension or collar 22 is shown as having a bore 24 the inner reduced end 25 of which is threaded to receive a standard one-piece collet 26. The collet 26 comprises a tubular body having an inner reduced threaded end which is screwed into the reduced threaded part 25 of the bore in the collar 22 and is split longitudinally, as indicated at 29, so as to be capable of contracting to grip the workpiece 14. The outer end of the collet is provided with a beveled or conical face 30 which enlarges toward the outer extremity of the collet and provides the cam face whereby the collet is clamped to the workpiece as hereinafter described. The inward movement of the collet, in screwing it into the reduced threaded part of the bore of the sleeve 22, is determined by a stop ring 31 which is set into the annular plate 21 and can be held in place by screws 32 or in any other suitable manner, the inside diameter of the ring 31 being the same as the inside diameter 15 of the main spindle of the lathe. Slidingly mounted on the exterior of the sleeve 22 is a sleeve 33, the outer end of which is formed to provide an internal taper or conical face 34 which conforms to and fits the external tapering or conical face 30 of the collet 26. It will be seen that when the sliding sleeve 33 is moving to the right, as viewed in Fig. 2, the split collet 26 is compressed to grip the workpiece 14 and when this sliding sleeve 33 is moved to the left, as viewed in Fig. 5, the workpiece 14 is released from the collet. The sliding sleeve 33 is capable of so sliding axially relative to the collet holding sleeve 22 but is prevented from rotating relative thereto by means of a set screw 35 which is shown as screwed into one side of the collet holding sleeve and as arranged in an axial slot 36 provided in the sliding sleeve 33.

The third sleeve 38 is mounted on the sliding sleeve 33 and is held in place thereon by a lock nut or ring 39 which is screwed into the outer end of the sliding sleeve 33 and is held in position thereon by a set screw 40. A collar 41 is fast to the inner end of this third sleeve 38 and is shown as having three pairs of radially projecting ears 43 which carry pins 44, these pins being arranged tangentially and equidistant from the major axis of the chuck. Each of these pins carries a dog 45, one end of each of these dogs extending outwardly and toward the periphery of the annular plate 21 to provide a pointed end 46 which engages the outer face of the plate 21 near its end and the other end of each of the dogs 45 is formed to provide an extension 48.

The extensions 48 of the dogs 45 engage the outer face of a collar 50 which is slidingly mounted on the sleeve 38. This collar is formed to provide a tapering or cone face 51 leading to a cylindrical face 52 and the outer end of the collar is also formed to provide an annular outwardly extending flange 53 to which the external sleeve 54 of the chuck is pinned, as indicated at 55. The opposite end of the external sleeve 54 is slidingly fitted on the periphery of the annular plate 21 so as to enclose the dogs and other working parts of the clutch. The chuck is operated through the axial movement of the external sleeve 54 and to effect such movement an operating handle 60 is provided. This operating handle can be of any suitable construction but is shown as comprising a tube 61 which encircles the external sleeve 54 and as having an operating handle projecting upwardly therefrom. The lower end of the tube 61 is provided with an ear 63 which is secured by means of a pivot screw 64 to a pin 65 which forms part of the standard for the handle. The lower end of the supporting pin 65 is shown as extending through bores provided in a pair of clamping plates 66 and 68, these being clamped to the upper and lower faces of the bed of the lathe by means of clamping screws 69 and the pin 65 being shown as held in proper vertical position by means of a set screw 70 in the upper clamping plate 66. The sides of the tube 61 are shown as flattened, as indicated at 72, and carry screws 73 which in turn carry shoes 74, which ride in an annular groove 75 provided in the external collar 54 of the chuck.

Since all parts of the collet chuck, with the exception of the handle 60 and its shoes 74, are mounted on the face plate 13 of the lathe, these parts are continuously rotating. To place a piece 14 in the collet chuck, the operator swings the handle 60 from the dotted line to the full line position shown in Fig. 1. This moves the parts to the position shown in Fig. 5. Since the handle 60 is fulcrumed on the pivot pin 64 and its shoes 74 ride in the groove 75 of the external sleeve 54, this sleeve is moved to the right hand position shown in Fig. 5 and carries with it the sliding collar 50. This permits the outer end 48 of each of the three dogs 45 to ride down the tapered face 51 of the sliding collar 50 and onto its reduced end, as shown in Fig. 5. The corresponding movement of the three dogs 45 effects a release of the pressure of these dogs against the end face of the annular plate 21, thus permitting the sleeves 38 and 33 to move to the left. This movement is effected by the pressure of the tapered outer end of the collet 26 against the tapered inner face 34 of the sleeve 33 and this movement of the sleeve 33 to the left permits the one-piece split collet 26 to expand.

The operator then inserts the workpiece 14 while the chuck is rotating. This piece can be inserted through the bore 15 of the main spindle 12 and it will be noted that the collet can receive workpieces having the full diameter of the bore in the main spindle 12. After the workpiece has been so inserted, the operator throws the handle 60 back to the dotted line position shown in Fig. 1. This movement of the handle 60, through the shoes 74, moves the external sleeve 54 to the left, as viewed in Fig. 2. The external sleeve 54 carries with it the sliding collar 50 and hence the outer end 48 of each of the dogs 45 is caused to ride up on the taper 52 and onto the cylindrical face 51 of the sliding sleeve 50. This rotates each of the dogs 48 and forces its pointed end 46 against the end face of the annular plate 21. This forces the collar 41 and its sleeve 38 to the right and against the adjusting nut 39. Since this nut is screwed onto the sliding sleeve 33, this sleeve is likewise moved to the right and its internal taper 34 is forced axially against the external taper 30 of the collet 26 so as to compress this collet around the workpiece 14 and secure this workpiece in the chuck.

Figure 2:
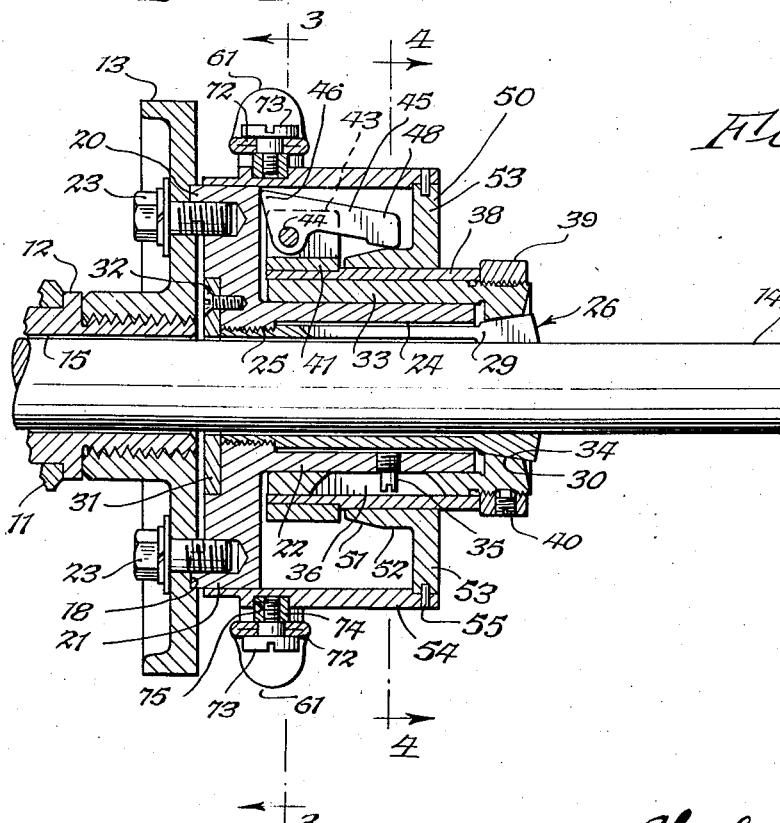
Fig. 2 is a fragmentary horizontal section, taken on line 2—2 of Fig. 1.

The adjustment of the chuck to obtain full release and full gripping of the workpiece 14 through the movement of the handle shown in Fig. 1 is effected by means of the adjusting nut 39 which adjusts the relation between the engaging tapers 30 and 34 of the collet and sliding sleeve 33 and the dogs 45.

It will be noted that the collet is rigidly fixed to the core or inner sleeve 22 of the chuck and that the sliding sleeve 33 which has the collet engaging taper 34 also carries the adjusting nut 39, this providing a simple and completely accessible structure. It will further be noted that the dogs 45 are unique in their action, the outward movement of the outer ends of these dogs serving to exert pressure against the end face of the annular plate 21 of the chuck thereby to move the dog carrying collar axially and effect contraction of the collet around the workpiece. It will also be appreciated that the collet chuck can be mounted for use as a dividing head and that all horizontal milling angles can be obtained and also that the chuck can be used for drilling, tapping and various other operations.

The form of the invention shown in Fig. 6 is similar to the form of the invention shown in Figs. 1–5 except that instead of relying upon the expansive effect of the collet to return the parts to the position shown in Fig. 5, a plurality of auxiliary springs are built into the chuck for this purpose. Thus, in the form of the invention shown in Figs. 1–5 the movement of the parts to the position shown in Fig. 5 is effected by the pressure of the tapered outer end of the collet 26 bearing against the tapered inner face 34 of the sleeve 33 and this movement of the sleeve 33 to the left permits the one-piece split collet 26 to expand.

In the form of the invention shown in Fig. 6, the sleeve 33 is provided with a plurality of slots 36a which are similar to the slot 36 in the form of the invention shown in Figs. 1–5 except that they are enlarged to each receive a helical compression spring 80 which bears at one end against the screw 35 and at its other end against the sleeve 33. These springs are arranged so as to urge the sleeve 33 to the left, as viewed in Fig. 6, thereby to urge the parts to the position shown in Fig. 5. These springs can be very light inasmuch as the expansive effect of the collet alone will secure this movement, these springs providing additional insurance.

From the foregoing it will be seen that the present invention provides a collet chuck of extremely simple and compact construction which can be operated with ease and will reliably hold the workpiece in a lathe or the like. It will further be seen that the chuck can be operated while the lathe is in operation thereby greatly facilitating its use. The chuck can also be furnished as an accessory to any lathe or similar tool and can readily be attached to it or removed therefrom. The chuck is also rugged in construction and will stand up under conditions of severe and constant use without getting out of order or requiring repairs.

I claim as my invention:

1. A collet chuck, comprising a sleeve adapted to be secured to a rotating part and having an end plate extending radially from one end thereof, the bore of said sleeve being threaded adjacent said end plate to secure one end of a collet therein, said collet having an externally tapered head at its opposite end which extends outwardly from said sleeve, a sliding sleeve mounted to slide axially on said first sleeve and having an internally tapered end engaging the tapered head of said collet, an adjusting nut screwed on the end of said sliding sleeve forming said tapered end, an outer sleeve mounted for axial movement on said sliding sleeve and movable against said adjusting nut to effect that axial movement of said tapered end relative to said tapered head to contract said collet, and means interposed between said end plate and said outer sleeve to effect such movement of said outer sleeve.

2. A collet chuck, comprising a sleeve adapted to be secured to a rotating part and having an end plate extending radially from one end thereof, the bore of said sleeve being threaded adjacent said end plate to secure one end of a collet therein, said collet having an externally tapered head at its opposite end which extends outwardly from said sleeve, a sliding sleeve mounted to slide axially on said first sleeve and having an internally tapered end engaging the tapered head of said collet, an adjusting nut screwed on the end of said sliding sleeve forming said tapered end, an outer sleeve mounted for axial movement on said sliding sleeve and movable against said adjusting nut to effect that axial movement of said tapered end relative to said tapered head to contract said collet, and means interposed between said end plate and said outer sleeve to effect such movement of said outer sleeve, comprising a plurality of dogs pivotally mounted on said outer sleeve and each having an extension engaging the end face of said end plate, and means for rotating said dogs.

3. A collet chuck, comprising a sleeve adapted to be secured to a rotating part, means for securing a collet in said sleeve with its externally tapered head extending axially outward therefrom, a sliding sleeve mounted to slide axially on said first sleeve and having an internally tapered end engaging the tapered head of said collet, an outer sleeve mounted on said sliding sleeve for axial sliding movement thereon, means for limiting the axial movement of said outer sleeve relative to said sliding sleeve to effect axial movement of said tapered end relative to said tapered head for contracting said collet through motion derived from the axial movement of said outer sleeve relative to said first sleeve, and means for effecting said axial movement of said outer sleeve relative to said first sleeve.

4. A collet chuck, comprising a sleeve adapted to be secured to a rotating part and having an end plate extending radially from one end thereof, means for securing a collet in said sleeve with its externally tapered head extending axially outward therefrom, a sliding sleeve mounted to slide axially on said first sleeve and having an internally tapered end engaging the tapered head of said collet, an outer sleeve mounted on said sliding sleeve for axial sliding movement thereon, means for limiting the axial movement of said outer sleeve relative to said sliding sleeve to effect axial movement of said tapered end relative to said tapered head for contracting said collet through motion derived from the axial movement of said outer sleeve relative to said first sleeve, and means for effecting said axial movement of said outer sleeve relative to said first sleeve, comprising a plurality of dogs pivoted on said outer sleeve, each of said dogs having one end engaging the end face of said end plate, and means for rotating said dogs.

5. A collet chuck, comprising a sleeve adapted to be secured to a rotating part, means for securing a collet in said sleeve with its externally tapered head extending axially outward therefrom, a sliding sleeve mounted to slide axially on said first sleeve and having an internally tapered end engaging the tapered head of said collet, means for preventing rotation of said sliding sleeve relative to said first sleeve, an outer sleeve mounted on said sliding sleeve for axial sliding movement thereon, means for limiting the axial movement of said outer sleeve relative to said sliding sleeve to effect axial movement of said tapered end relative to said tapered head for contracting said collet through motion derived from the axial movement of said outer sleeve relative to said first sleeve, and means for effecting said axial movement of said outer sleeve relative to said first sleeve.

6. A collet chuck, comprising a sleeve adapted to be secured to a rotating part and having an end plate extending radially outward from one end thereof, the bore of said sleeve being threaded adjacent said end plate to secure one end of a collet therein, said collet having an externally tapered head at its opposite end which extends outwardly from said sleeve, a sliding sleeve mounted to slide axially on said first sleeve and having an internally tapered end engaging the tapered head of said collet, means for preventing rotation of said sliding sleeve relative to said first sleeve, an outer sleeve mounted on said sliding sleeve for axial sliding movement thereon, means on the end of said sleeve forming said tapered head for limiting the axial movement of said outer sleeve relative to said sliding sleeve to effect axial movement of said tapered end relative to said tapered head for contracting said collet through motion derived from the axial movement of said outer sleeve relative to said first sleeve, a plurality of dogs pivoted on said outer sleeve, each of said dogs having one end engaging the end face of said end plate and means for rotating said dogs.

7. A collet chuck, comprising a sleeve adapted to be secured to a rotating part and having an end plate extending radially from one end thereof, means for securing a collet in said sleeve with its externally tapered head extending axially outward therefrom, a sliding sleeve mounted to slide axially on said first sleeve and having an internally tapered end engaging the tapered head of said collet, an outer sleeve mounted on said sliding sleeve for axial sliding movement thereon, means for limiting the axial movement of said outer sleeve relative to said sliding sleeve to effect axial movement of said tapered end relative to said tapered head for contracting said collet through motion derived from the axial movement of said outer sleeve relative to said first sleeve, and means for effecting said axial movement of said outer sleeve relative to said first sleeve comprising a plurality of dogs pivoted on said outer sleeve, each of said dogs having one end engaging the end face of said end plate, and means for rotating said dogs, comprising a collar slidingly mounted on said outer sleeve and having a conical face engaging another end of each of said dogs, and means for moving said collar axially to effect said rotation of said dogs.

8. A collet chuck, comprising a sleeve adapted to be secured to a rotating part and having an end plate extending radially outward from one end thereof, the bore of said sleeve being threaded adjacent said end plate to secure one end of a collet therein, said collet having an externally tapered head at its opposite end which extends outwardly from said sleeve, a sliding sleeve mounted to slide axially on said first sleeve and having an internally tapered end engaging the tapered head of said collet, means for preventing rotation of said sliding sleeve relative to said first sleeve, an outer sleeve mounted on said sliding sleeve for axial sliding movement thereon, means on the end of said sleeve forming said tapered head for limiting the axial movement of said outer sleeve relative to said sliding sleeve to effect axial movement of said tapered end relative to said tapered head for contracting said collet through motion derived from the axial movement of said outer sleeve relative to said first sleeve, a plurality of dogs pivoted on said outer sleeve, each of said dogs having one end engaging the end face of said end plate and means for rotating said dogs, comprising a collar slidingly mounted on said outer sleeve and having a conical face engaging another end of said dogs, and means for moving said collar axially to effect said rotation of said dogs.

9. A collet chuck, comprising a sleeve adapted to be secured to a rotating part and having an end plate extending radially from one end thereof, means for securing a collet in said sleeve with its externally tapered head extending axially outward therefrom, a sliding sleeve mounted to slide axially on said first sleeve and having an internally tapered end engaging the tapered head of said collet, an outer sleeve mounted on said sliding sleeve for axial sliding movement thereon, means for limiting the axial movement of said outer sleeve relative to said sliding sleeve to effect axial movement of said tapered end relative to said tapered head for contracting said collet through motion derived from the axial movement of said outer sleeve relative to said first sleeve, and means for effecting said axial movement of said outer sleeve relative to said first sleeve, comprising a plurality of dogs pivoted on said outer sleeve, each of said dogs having one end engaging the end face of said end plate, and means for rotating said dogs, comprising a collar slidingly mounted on said outer sleeve and having a conical face engaging another end of each of said dogs, and means mounted on the bed of said lathe for moving said collar axially to effect said rotation of said dogs.

CHARLES W. HOPPE.